United States Patent
Lundbäck

(10) Patent No.: US 6,274,046 B1
(45) Date of Patent: *Aug. 14, 2001

(54) METHOD AND APPARATUS FOR COLLECTING MATTER FLOATING ON A BODY OF WATER

(76) Inventor: Stig Lundbäck, Östra Tynningö, Vaxholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,405
(22) PCT Filed: Oct. 14, 1997
(86) PCT No.: PCT/SE97/01723
  § 371 Date: Apr. 13, 1999
  § 102(e) Date: Apr. 13, 1999
(87) PCT Pub. No.: WO98/16690
  PCT Pub. Date: Apr. 23, 1998

(30) Foreign Application Priority Data

Oct. 14, 1996 (SE) .................................................. 9603777

(51) Int. Cl.⁷ ..................................................... E02B 15/04
(52) U.S. Cl. ................... 210/747; 210/242.3; 210/242.4; 210/924
(58) Field of Search ........................... 210/112, 114, 210/242.3, 242.4, 170, 502.1, 747, 776, 923, 924

(56) References Cited

U.S. PATENT DOCUMENTS

| | | | |
|---|---|---|---|
| 3,487,927 | * 1/1970 | Yahnke | 210/167 |
| 3,608,727 | * 9/1971 | Grutsch | 210/242.4 |
| 3,701,429 | * 10/1972 | Schell | 210/923 |
| 3,722,688 | * 3/1973 | Wirsching | 210/923 |
| 3,741,391 | * 6/1973 | Donsbach | 210/123 |
| 3,853,768 | 12/1974 | Bagnulo | 210/242 |
| 4,356,086 | * 10/1982 | Oberg | 210/115 |
| 4,391,707 | * 7/1983 | Gordon | 210/923 |
| 5,888,406 | * 3/1999 | Hnatiuk | 210/923 |

FOREIGN PATENT DOCUMENTS

WO 97/07292  2/1997  (WO).

OTHER PUBLICATIONS

Derwent's abstract, No. 3885 J/48, week 8248, Abstract of SU, 897935 (telenev s 1), Feb. 15, 1982.

* cited by examiner

Primary Examiner—David A. Simmons
Assistant Examiner—Frank M. Lawrence

(57) ABSTRACT

To collect oil or other matter floating on the surface of a body of water a collection vessel (11) having a collection compartment (A) is immersed in the water. A surface layer carrying the matter to be collected is caused to flow from the area around the collection vessel into the collection compartment (A) over a vertically movable skimming weir (15A) on the collection vessel. Water is discharged from the lower portion of the collection compartment such that a liquid level lower than that of the surrounding water is maintained in the collection compartment (A). Floating matter accumulated on the liquid surface in the collection compartment is removed; if the matter to be collected is low-viscosity oil, an oil-absorbing body (22) made of a hydrophobic material is used to absorb the accumulated oil from the liquid surface in the collection compartment. A dashpot damping device (28–30) dampens vertical oscillations of the skimming weir (15).

8 Claims, 4 Drawing Sheets

METHOD AND APPARATUS FOR COLLECTING MATTER FLOATING ON A BODY OF WATER

BACKGROUND OF THE INVENTION

This invention broadly relates to a method and an apparatus for collecting matter floating on a body of water, namely collecting such matter by skimming a surface layer carrying the matter to be collected and separating the matter from the water of the skimmed layer. Certain embodiments of the invention are specially directed to the collection of spilled oil, particularly low-viscosity oil. The invention will therefore be described with emphasis on that application, but it is also applicable to other types of floating debris.

According to a known skimming technique, a collection vessel is immersed in the body of water carrying the matter to be collected such that an overflow rim of the collection vessel is just beneath the surface. Water is constantly pumped out of the lower portion of the collection vessel at such a rate that the outflow from the collection vessel balances the inflow of water into the collection vessel over the rim thereof to maintain a sink—that is, an area the level of which is lower than the level of the surrounding water—in the collection vessel. The floating matter carried or entrained by the inflowing water is accumulated in the sink and can be removed continuously or intermittently. Examples of this skimming technique are disclosed in DE-B-20 30 209 and WO97/07292 (published Feb. 27, 1997).

This technique lends itself to a rapid and energy-efficient collection of oil or other debris floating on water, because large volumes of water can be rapidly pumped through the collection vessel at a fairly low rate of energy consumption.

Spillage of low-viscosity oil in waterways and other open waters occurs frequently and presents special problems. When an oil spillage is detected, it is desirable to be able quickly to take a sample of the oil so that it can be analyzed. However, low-viscosity oil forms an extremely thin layer on the water surface, and even with a very high rate of flow of water through the collection vessel it is very difficult, or even almost impossible, to collect substantial amounts of the oil using known techniques. Actually, it is hardly possible to collect even an amount of oil which is sufficient for an analysis of the characteristics of the oil.

SUMMARY OF THE INVENTION

The present invention provides a method and an apparatus for rapid and efficient collection of floating debris, such as oil and other kinds of floating matter. According to one aspect of the invention, even low-viscosity oil can be rapidly collected in amounts adequate for analysis. According to a different aspect of the invention, which is not limited to debris in the form of oil, a system for damping oscillations of the overflow rim of the collection vessel is provided.

The invention is advantageously applicable to the method and apparatus disclosed in WO97/07292. However, its field of application is not so limited, but extends to other methods and apparatus based on the above-described skimming technique.

Embodiments of the invention will now be described by way of example with reference to the accompanying drawings and to WO97/07292 the disclosure of which is incorporated herein by reference.

DETAILED DESCRIPTION OF THE PREFERRED EMBODIMENT

Figure 1:
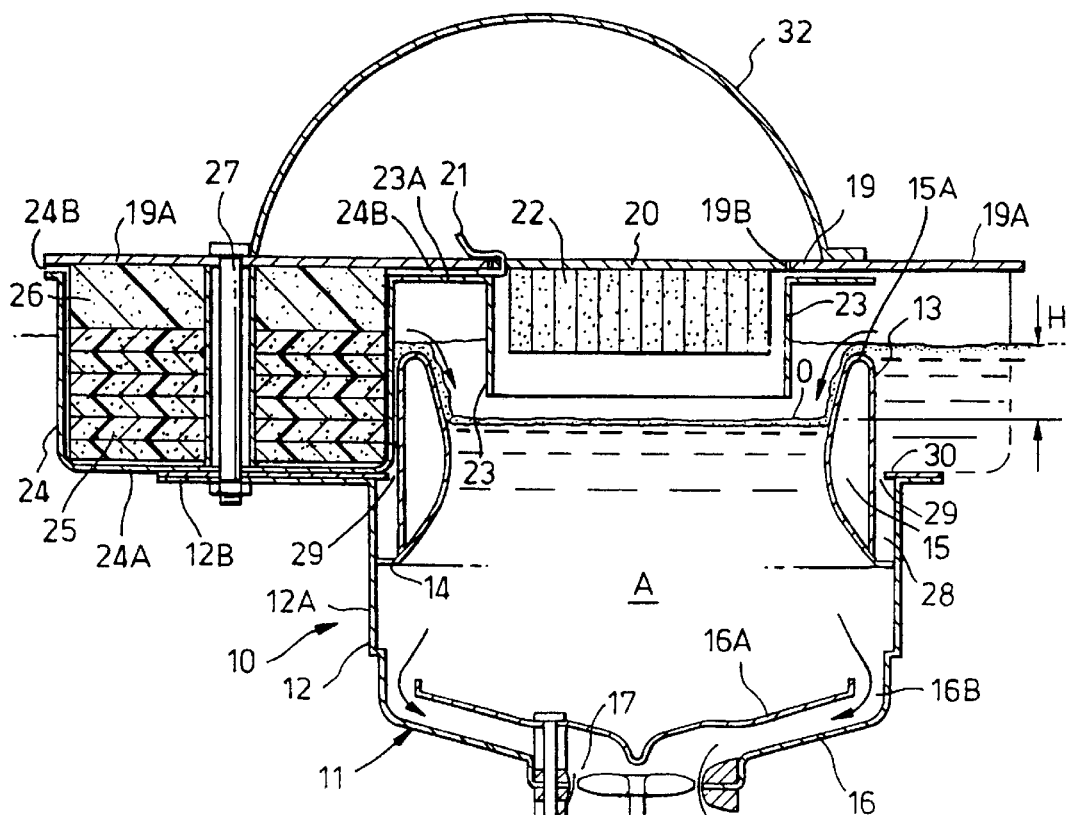
FIG. 1 is a vertical sectional view of a collecting apparatus according to the invention during collection of oil floating on a body of water.

The collecting apparatus shown in the drawings, which is generally designated by 10, embodies the principles of operation and construction shown and explained in WO97/07292 to which reference is made for a detailed description of such principles. The embodiments of the apparatus specifically shown in the drawings and described below are designed and dimensioned primarily for use of the apparatus for collection of relatively small volumes of oil, such as for sampling purposes.

Accordingly, the collecting apparatus 10 comprises a substantially cylindrical, open-topped collection vessel 11 which is in upright position in operation of the apparatus. The collection vessel 11 defines a collection compartment A and includes a lower part 12 and an upper part 13, which is telescopically slidable up and down in the lower part 12. An outwardly directed annular flange 14 is provided at the lower end of the upper part 13 and extends to the inner side of the lower part 12 to form a seal (a perfect seal is not required) and to guide the movements of the upper part 13 relative to the lower part 12. The major portion of the upper part 13 forms an annular buoyant body 15, the upper end of which defines an annular skimming weir 15A over which water can flow omnidirectionally into the collection compartment A from the surrounding body of water.

A bottom wall 16 of the collection vessel 11 is formed with a central opening 17 in which the impeller of an electrically driven pump 18, namely a propeller pump, is mounted. A battery 18A supplies the pump motor 18B through an electronic control unit 18C. A watertight pump housing 18D encloses the motor 18A, the battery 18B and the control unit 18C and is secured to the bottom wall 16 by means of struts 18E, only one of which is shown in the drawings.

Mounted above the bottom wall 16 of the collection vessel 11 is a circular guide plate 16A. Together with the circumferential side wall 12A of the lower vessel part 12 this guide plate defines an annular inlet 16B to the bottom wall opening 17.

A top plate 19 is vertically spaced above the collection vessel 11. Three lobes 19A of the top plate 19 project horizontally beyond the circumference of the collection vessel 11. A central circular opening 19B in the top plate 19 accommodates a removable circular plate 20 which is held to the top plate by means of spring clips 21 and to the under-side of which a hydrophobic oil-absorbing body 22 is attached. The oil-absorbing body, which is in the shape of a generally cylindrical flat disk, can be made of any suitable material capable of absorbing oil while repelling water. Several suitable such materials are commercially available, such as the felt or cloth materials commonly used for absorbing oil in the of motor boats, an example being the material marketed by Minnesota Mining and Manufacturing Company under the designation T.151. Preferably, the oil-absorbing body 22 is formed with a plurality of narrow indents or recesses extending radially from the periphery toward the center of the body.

A cylindrical collar 23 concentric with and spaced radially outwardly from the oil-absorbing body 22 and spaced radially inwardly from the buoyant body 15A extends downwardly a short distance beyond the underside of the oil-absorbing body into the upper part 13 of the collection vessel 11.

The cylindrical collar 23 is integral with three circumferentially spaced-apart cup-shaped receptacles 24 positioned between the lobes 19A of the top plate 19 and similar lobes 12B of the lower collection vessel part 12. Each receptacle 24 contains a water-absorbing body 25 in the lower portion thereof and a buoyant body 26, made of expanded styrene plastic, for example, disposed between the water-absorbing body 25 and the associated top plate lobe 19A. Tie rods 27 hold the receptacles 24 in position between the lobes 19A of the top plate 19 and the lobes 12B of the lower collection vessel part 12.

When the apparatus 10 is placed in the water, openings 24A formed in the bottom wall of the receptacles 24 allow water to be absorbed into the water-absorbing bodies 25, which are made of a sponge-like material capable of rapidly absorbing substantial amounts of water. Vent passages 24B allow air in the receptacles, such as in the water-absorbing bodies 25 to escape to the ambient atmosphere.

Figure 1A:
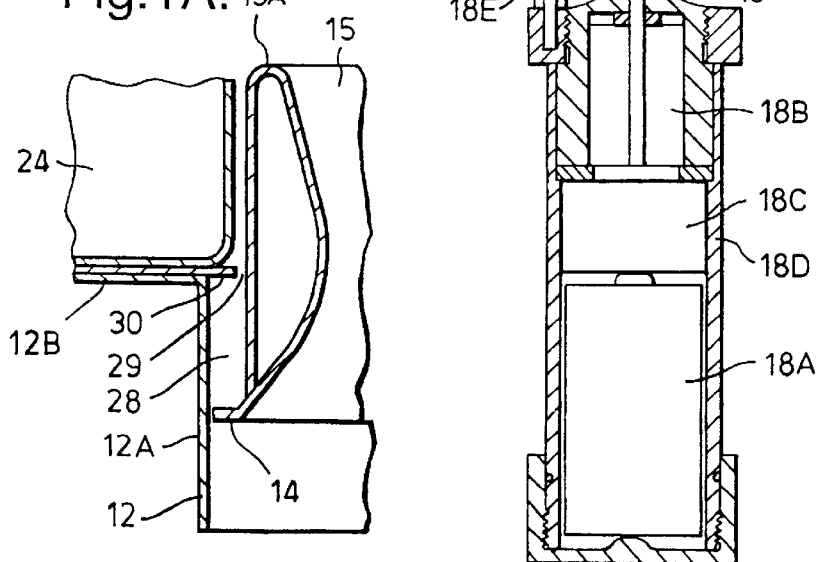
FIG. 1A shows a detail of FIG. 1 drawn to a larger scale.

As shown in larger scale in FIG. 1A, the circumferential wall 12A of the lower collection vessel part 12 together with the circumferential wall 13B of the upper collection vessel part 13 and the flange 14 of the latter forms an annular variable-volume compartment 28. A restricted passage 29 defined by the circumferential wall 13B of the upper collection vessel part 13 and an inwardly directed flange plate 30 supported by the lobes 12B permit restricted flow of water between the compartment 28 and the body of water in which the collecting apparatus 10 operates. The compartment 28 thus serves as a dashpot-type damping chamber to dampen vertical oscillations of the upper collection vessel part 13.

Naturally, the hydraulic or dashpot damping device formed by the elements which define the annular compartment 28 and restrict the flow of water into and out of it, can also be used in the collecting apparatus disclosed in WO97/07292 and similar collecting apparatus having a collection vessel comprising a skimming weir which is vertically oscillatable in the body of water in response to variations in the flow of water into and out of the collection vessel.

The collecting apparatus 10 may be placed into the water, e.g. in a detected oil slick on the water, in any suitable manner, such as from a helicopter or a boat. Operation of the pump 18 may be initiated manually just before the apparatus is dropped into the water, by remote control or automatically upon immersion in the water.

When the collecting apparatus 10 is placed in the water the space in the receptacles 24 occupied by the water absorbing bodies 25 will immediately be filled with enough water to allow the entire apparatus to assume a position such that the collection compartment A will be filled with water. The pump 18 will tend to empty the collection compartment A through the bottom wall opening 17 of the collection vessel 11, but the collection compartment A will be replenished with water flowing over the skimmer weir 15A. A balance between the omnidirectional inflow of oil and water over the skimming weir 15A and the outflow of water through the bottom wall opening 17 will be established and maintained such that a sink will be maintained in the collection compartment A. By virtue of its lower density, the oil flowing into the collection compartment A will accumulate and form a layer O in the sink as is indicated in FIG. 1.

It has been found that a suitable difference H in the levels of the liquid surface of the collection compartment A and the liquid surface outside the collection compartment is about 15 mm, regardless of the rate of flow of water through the collection compartment A. Those components of the collecting apparatus, primarily the buoyant body 15, the flange 14 and the pump 18, which have an influence on the difference H in the levels should therefore be dimensioned accordingly. A greater difference means a higher energy consumption and should be avoided to save the battery.

Any tendency to disturb the balance and change the difference H in liquid levels, e.g. as a result of movements of the surface of the body of liquid, will be rapidly offset by the pump 18 increasing its throughput in response to a reduced difference or reducing its throughput in response to an increased difference and by the upper collection vessel part 13 moving upwards in response to a reduced difference and downwards in response to an increased difference. The dashpot damping arrangement which includes the annular damping compartment 28 and the restricted passage 29 prevents excessive oscillations of the upper collection vessel part 13.

Figure 2:
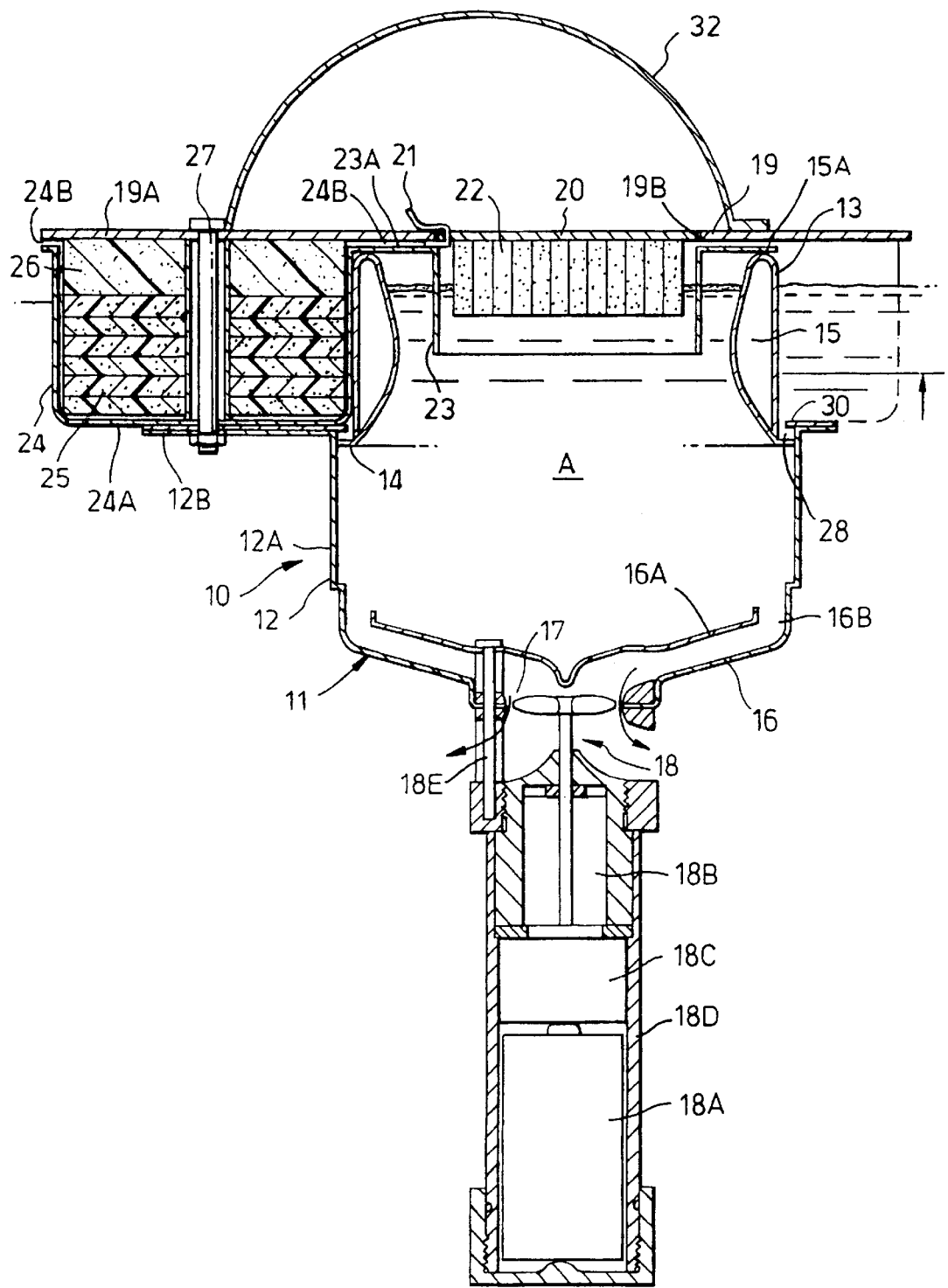
FIG. 2 is a view corresponding to FIG. 1 and shows the collecting apparatus in a position the collecting apparatus takes during a phase of its operation in which oil accumulated in a preceding phase is absorbed by an oil-absorbing body.

When the floating collecting apparatus 10 has operated as described for a predetermined period, 10 minutes for example, the control unit 18C will switch off the pump 18. As a result, the liquid level in the collection compartment A and the liquid level of the surrounding body of liquid will be equalized. Moreover, as shown in FIG. 2 the buoyant body 15 will rise to a position in which the skimming weir 15A is above the water surfaces and sealingly engages a flange 23A interconnecting the collar 23 and the receptacles 24. The liquid level in the collection compartment A will also rise and thereby raise the accumulated layer O of oil into contact with the oil-absorbing body 22 so that the accumulated oil, or at least a substantial portion of it, can be absorbed.

If desired, the pump control unit 18c can reverse the pump 18 upon completion of the collection period so that the liquid level in the collection compartment A will rise above that of the surrounding body of liquid.

The pump control unit 18C advantageously is programmed to cause the pump 18 to run in opposite direction for several successive short periods after the or each collecting cycle, so that the oil-absorbing body 22 is repeatedly immersed in and raised from the liquid in the collection compartment A. It has been found that such repeated immersion and raising of the porous oil-absorbing body and the consequent filling and draining of the pores of the body with oil-entraining water greatly improves the absorption of the oil.

One or more additional similar collection cycles may be carried out, e.g. until the battery 18A has become discharged. The collecting apparatus is then recovered and the oil absorbed by the oil-absorbing body 22 is extracted and subjected to analysis.

To facilitate visual detection of the apparatus 10 if it has been left unattended during the collection, three brightly coloured upstanding bows 32 are attached to the upper side of the top plate 19. These bows also facilitate catching the collecting apparatus by means of hooks or other suitable implements.

Most of the major components of the collecting apparatus 10 can be made of plastic, e.g. by injection moulding, and the cost may be sufficiently low to warrant use of the apparatus as a disposable item.

Figure 3:
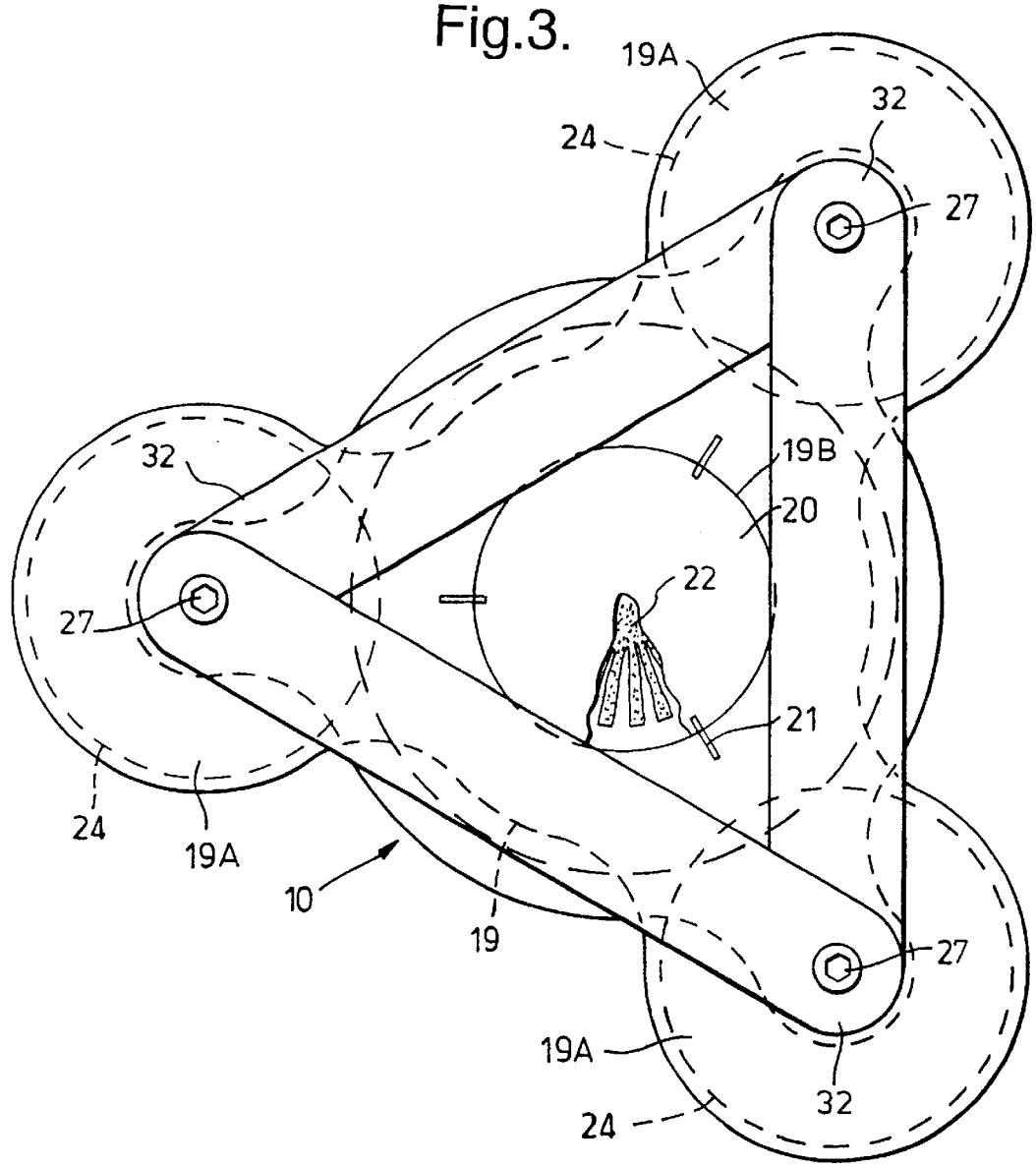
FIG. 3 is a plan view of the apparatus shown in FIG. 1.
Figure 4:
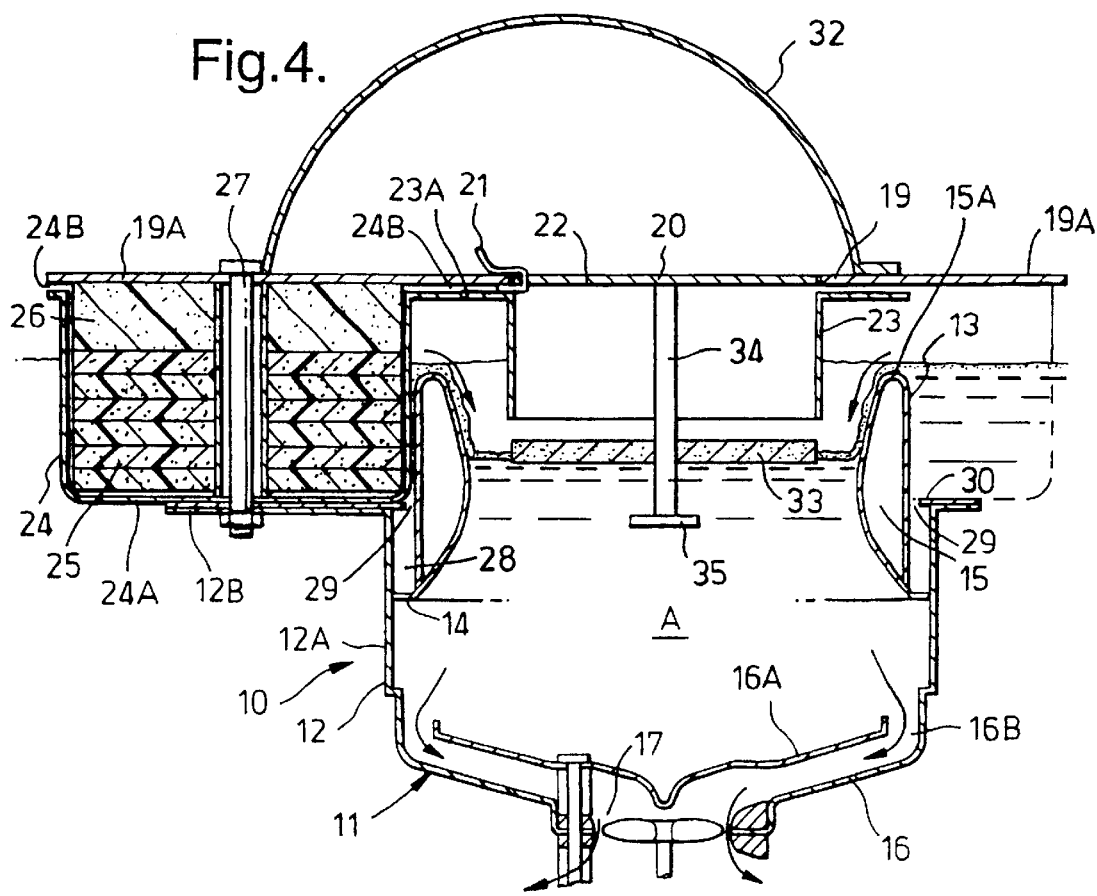
FIG. 4 is a view corresponding to FIG. 1 of a modified embodiment.

The modified embodiment of the collecting apparatus 10 shown in FIG. 4 differs from the embodiment shown in FIGS. 1–3 only in respect of the arrangement of the oil-absorbing body 33.

In FIG. 4, the oil-absorbing body 33 is a buoyant circular disk arranged to float on the liquid in the collection compartment A during the collection. To this end it is slidable vertically on a central guide post 34 secured to the removable plate 20. A flange 35 secured to the lower end of the guide post 34 prevents the oil-absorbing body 33 from falling off the guide post. In this case the oil accumulating in the liquid sink maintained in the collection compartment A is continuously brought into contact with the oil-absorbing body 33 and absorbed into it. As in the embodiment shown in FIGS. 1–3, the circumferentially distributed narrow indents or recesses extending radially inwardly from the circumference of the oil-absorbing body facilitate the absorption.

Figure 5:
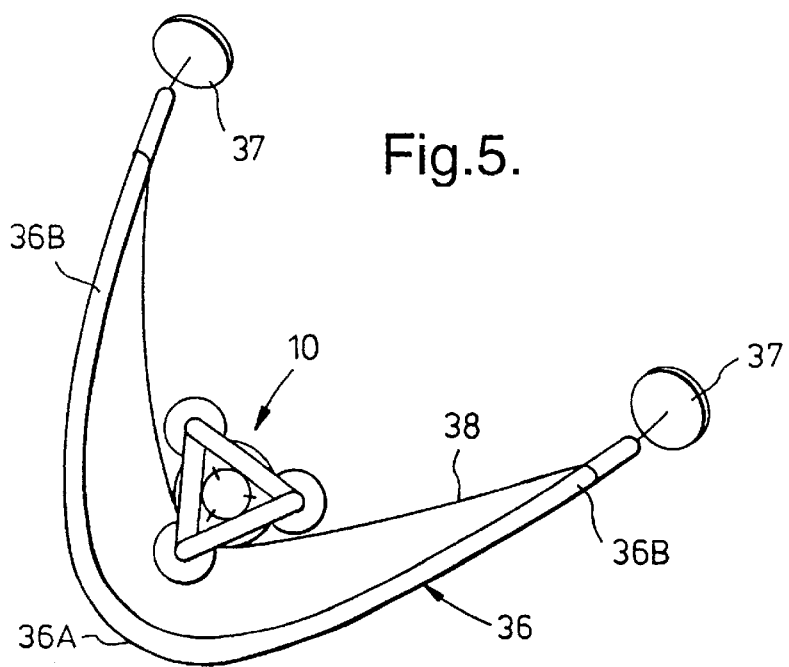
FIG. 5 is a perspective view showing the collecting apparatus of FIG. 1 in operation in association with an oil boom.

FIG. 5 schematically illustrates how the floating collecting apparatus 10 shown in FIGS. 1–4 can be used together with a curved length of a floating oil boom 36 to collect oil floating on the water within an area defined by the boom, namely at the inner region of a small bay which is delimited by the boom and into which the oil drifts.

The oil boom 36 is provided with drag anchors 37 at its ends. A length of spring wire 38 connects the collecting apparatus with the arms of the boom 36 such that the collecting apparatus is kept in the inner region of the bay, i.e. near the crest 36A of the bight formed by the boom 36. At the same time the wire keeps the arms 36B of the boom spread apart so that the arms can catch oil between them and guide it toward the crest area. A small sail or other suitable surface exposed to the wind applies a propelling force to the collecting apparatus 10 to orient the bighted boom 36 such that the gap between the ends of the boom 36 is in the teeth of the wind and catches the oil and guides it toward the collecting apparatus 10.

If desired or required, several booms, each associated with a collecting apparatus, can be interconnected to cover a larger area.

What is claimed is:

1. A method of collecting matter, including oil, floating on a body of water, comprising the steps of
    placing a floating self-contained collecting apparatus in the body of water,
    forming a floating boom (36) into a bight having a crest (36A) and a pair of diverging arms (36B), coupling the collecting apparatus (10) to the boom (36) to keep it in position between the arms (36B) of the bight in the region of the crest (36A) of the bight and to urge the arms apart,
    coupling draft anchors (37) to the free ends of the boom remote from the bight, and
    providing wind responsive propulsion means on the collecting apparatus (1) urging the crest downwind relative to the drag anchors.

2. Apparatus for collecting matter, including low-viscous oil, floating on a body of water comprising
    a collection vessel (11) which is immersible in a body of water and defines a collection compartment (A) and includes an upper part (13) having a skimming weir (15A) which defines an inlet to the collection compartment, means (18) for discharging water from the collection compartment (A) and thereby providing therein a water sink at a level lower than that of the surface of the body of water surrounding the collection vessel (11),
    means for collecting oil from the surface of water in the collection compartment (A) and an oil collecting means support within said collection vessel and releasably fixedly secured thereto.
    said oil-collecting means being a collection body (22, 33) of hydrophobic oil-absorbing material, supported by said supporting means in position for contact with, and absorbing the oil at the surface of the water in the collection compartment (A).

3. Apparatus according to claim 2, characterised in that the skimming weir (15A) is annular.

4. Apparatus according to claim 2, characterised in that the collection body (22,33) is discoid.

5. Apparatus according to claim 4, characterised in that the discoid collection body (22,33) is formed with a plurality of circumferentially spaced-apart narrow recesses.

6. Apparatus according to claim 2, characterised in that the collection body (22) is stationary with respect to the collection vessel (11).

7. Apparatus according to claim 2, characterised in that the collection body (33) is a buoyant body (33) guided for vertical movement relative to the collection vessel (11) in response to variation of the level of liquid in the collection compartment (A).

8. Apparatus for collecting matter, including oil, floating on a body of water, comprising
    a collection vessel (11) which is immersible in the body of water and which defines a collection compartment (A) and includes an upper part (13) having a skimming weir (15A) defining an inlet to the collection compartment, and a lower part (12), the upper part (13) being vertically movable relative to the lower part (12),
    means (18) for discharging water from the collection compartment (A) and maintaining therein a water sink at a level lower than that of the surface of the body of water surrounding the collection vessel (11), and
    characterised by
    a dashpot damping device connected between the upper and the lower collection vessel parts (12, 13) and including a variable-volume damping fluid compartment (28) defined between a side wall (12A) of the lower collection vessel part (12) and a side wall of the upper collection vessel part (13), and means defining a restricted passage (29) for passing fluid into and out of the damping fluid compartment (28).

* * * * *